J. V. PUGH.
DETACHABLE WHEEL HUB.
APPLICATION FILED JAN. 6, 1912.
1,129,726.
Patented Feb. 23, 1915.
2 SHEETS—SHEET 1.
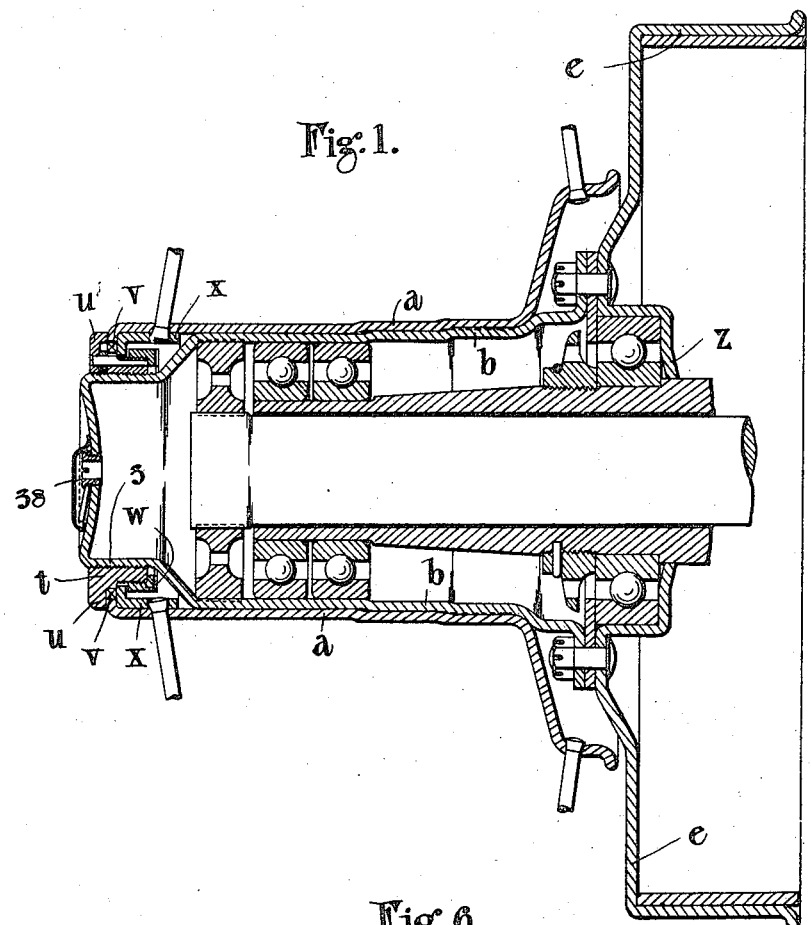
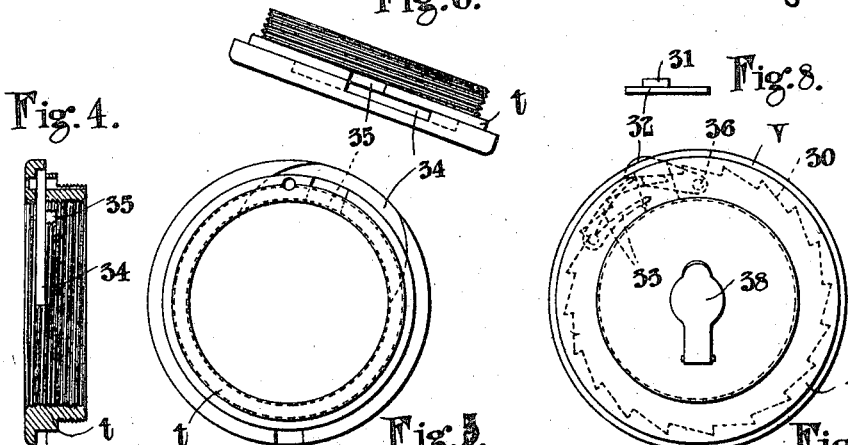
Witnesses
F. M. Barrett
C. E. Parsons
Inventor:
John Vernon Pugh
By: Spear, Middleton, Donaldson & Spear
Attys

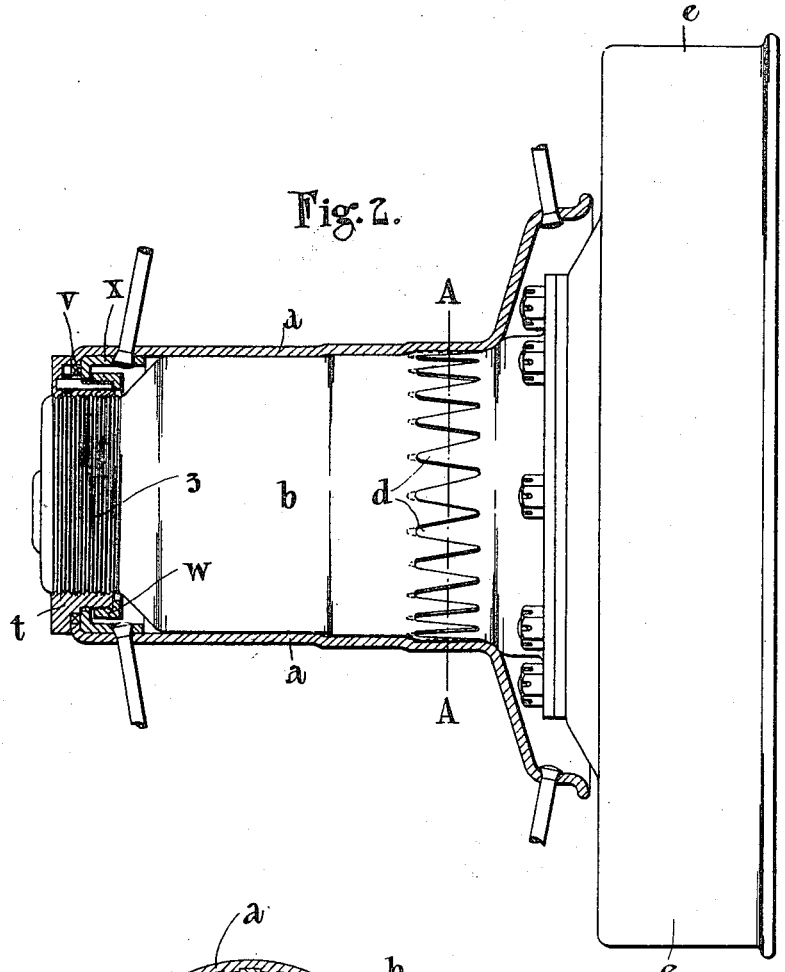
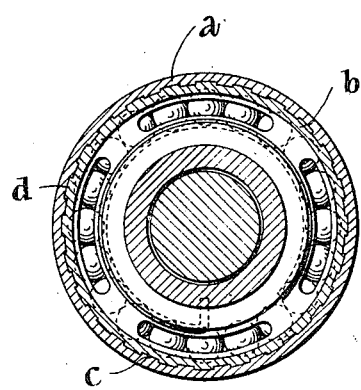

UNITED STATES PATENT OFFICE.

JOHN VERNON PUGH, OF ALLESLEY, ENGLAND.

DETACHABLE-WHEEL HUB.

1,129,726.

Specification of Letters Patent.

Patented Feb. 23, 1915.

Original application filed March 6, 1909, Serial No. 481,634. Divided and this application filed January 6, 1912. Serial No. 669,859.

*To all whom it may concern:*

Be it known that I, JOHN VERNON PUGH, a subject of the King of Great Britain and Ireland, and residing at Guiting House, Allesley, in the county of Warwick, England, have invented certain new and useful Improvements in Detachable-Wheel Hubs, of which the following is a specification.

This invention relates to improvements in detachable wheels for motor and other vehicles.

The invention consists in a detachable wheel having an outer hub part detachable from an inner hub part carried upon an axle or axle sleeve, said parts being formed so that the end of the inner hub part extends through the means which holds the detachable hub part to said inner hub part.

According to another feature of the invention the inner hub part is constructed in separable portions having a closed end, the detachable part being secured upon the inner part by a locking ring. By this construction the main or outer portion of the inner hub part may be formed of a stamping with a closed outer end and the length of the hub beyond the outer spokes of the wheel may be considerably reduced because no large end-closing nut is required. Suitable access for lubrication may be provided direct in the end of the inner hub part.

The invention also consists in the improved construction of detachable wheels and details thereof as hereinafter indicated.

Referring now to the accompanying drawings: Figure 1 is a sectional view of a detachable driving wheel with a divided permanent hub part and having a ring locking device. Fig. 2 is a view of a portion of the wheel shown in Fig. 1, the detachable hub part and locking ring being in section and the permanent hub part in elevation in order to illustrate the quickly tapered engaging and centering dogs. Fig. 3 is a sectional elevation on the line A—A of Fig. 2. Figs. 4, 5 and 6 are various views of the locking ring. Fig. 7 is an elevation of the outer end of the wheel hub shown in Fig. 1, the spokes and the rest of the hub being omitted. Fig. 8 is a detail view of the pawl shown in position in the locking ring in Fig. 7.

In carrying this invention into effect as shown in Fig. 1, I form the outer or detachable hub part $a$, of thin stamped metal, the inner end of which is preferably outwardly flanged to carry the inner spokes while the outer end is slightly inwardly flanged as shown at $v$ and carries a flanged stiffening ring $x$, to provide increased thickness for the outer spokes. The inner hub part $b$, is also made of stamped metal in two parts, one having preferably a closed outer end, and the other part taking the form of a cap, $z$, or brake drum $e$, or combining both as shown in the drawing. To provide clutch connections between the inner and outer hub parts, I form on the inside of the outer hub part, $a$, a number of quickly tapered dogs $c$, shown in Figs. 2 and 3, which may be formed by a stamping or pressing action, the amount of depression and the amount of metal removed by machining being small in order that the thickness of the metal shall not be reduced substantially. The permanent hub part, $b$, is likewise provided with wedge shaped engaging members $d$, to correspond with and enter into the others. These dogs are formed so that in forcing the outer hub on to the inner one, the dogs center the hub and wedge tightly into one another, there being as many dogs around the circumference of the hub as a given width of dog will allow. By forming the engaging dogs in this manner, I am able to maintain the maximum cross section of metal and to use stamped material without substantially weakening the structure at the clutch portion.

The outer end of the inner hub part is reduced in diameter and externally screw-threaded at 3 to receive a locking ring $t$ through which it projects. This ring is shown separately in Figs. 4, 5 and 6. The locking ring carries a flange $u$, which is adapted to bear against the flange $v$ at the outer end of the detachable hub part, the inner portion of this locking ring is screw-threaded to carry a collar $w$ which is preferably screwed to opposite hand to the thread by which the ring is attached to the inner hub part and which is adapted to bear on the inside of the flange of the stiffening ring $x$, in order to provide means for the positive withdrawal of the hub when the locking ring is unscrewed. The positive withdrawal ring may if desired be arranged in any other convenient way. By thus forming the lock nut and the withdrawal ring the thread of the lock ring may be got at for examination or for retapping, if it becomes damaged, without taking the locking ring from the detachable hub. Moreover as the ring is used and the end of the shell of the permanent hub is visible through the ring the fitter is able to see whether the thread is engaged in putting on the wheel or whether, when fixed the parts have been really screwed right home. In the home position of the detachable part the outer end of the ring may be arranged to come flush with the closed end of the permanent hub or to any predetermined marked position on the hub.

In order to lock the ring $t$ against inadvertent loosening I provide in the inner circumference of the outer flange $v$ a number of ratchet teeth 30, (see Fig. 7) with which teeth a pawl projection 31, on a pawl 32, pressed by a spring 33, is adapted to engage. The pawl 32, is carried within a recess 34, in the locking ring $t$. The pawl is normally held in engagement with the ratchet teeth 30, in order to prevent slackening back of the locking ring. The recess 34, is made in the ring $t$ by means of a circular saw working from the inside. This saw just breaks through the external surface of the ring and the slot so formed is widened out to an appropriate shape and a groove 35 (see Figs. 5 and 6) is made for the path of the projecting part of the pawl which is held in the slot by means of a pivot, 36, passing sidewise into the ring. When the locking device is assembled the pivot of the pawl device is prevented from coming out by the withdrawal collar $w$, before mentioned. Before the outer detachable hub part $a$, can be removed from the permanent hub part $b$ the locking ring $t$ must be unscrewed and to allow of this the pawl 32, must be pressed in so that the projection 31, on said pawl is clear of the ratchet teeth 30, formed on the outer hub part $a$, a suitable spanner being employed to effect this purpose. It is desirable however that the locking ring shall be as small in cross section as possible in order to obtain a substantial diameter of thread on the inner hub part without involving an excessively large diameter of the outer hub part. When the permanent hub part $b$ has a closed outer end I place a lubricator 38, in this end, preferably of the form described in my English Patent No. 198/1908.

Having now described my invention what I claim as new and desire to secure by Letters Patent is:—

1. In combination in a detachable wheel hub, an inner permanent part, an outer detachable part mounted thereon, ratchet teeth carried by said outer part, an internal flange to said outer part, an open screwed ring through which the end of said inner part projects carried upon a thread on said inner part and engaging both sides of said internal flange, and resilient pawl means located within a cavity in said ring adapted to engage said ratchet teeth.

2. In combination in a detachable wheel hub, an inner permanent part, an outer detachable part mounted thereon, an internal flange in said outer part, an open screwed ring which engages both sides of said internal flange co-acting with a thread on said inner part and a sealed end to said inner part projecting through said ring, whereby said outer hub part and locking ring are removed from said inner hub part without permitting the escape of lubricant therefrom.

3. In combination in a detachable wheel hub, an inner permanent part, an outer detachable part mounted thereon, ratchet teeth carried by the outer part, an internal flange to said outer part, an open ring screwed upon said inner part and rotating within said internal flange, projections on said ring engaging upon both sides of said internal flange, a sealed end to said inner part projecting through said ring, a pawl pivoted in a slot in said ring and a spring pressing said pawl into engagement with said ratchet teeth.

4. A detachable wheel hub having in combination an inner permanent part, an outer detachable part mounted thereon, a narrow inturned flange at the end of said outer part, a stiffening ring fixed within said end provided with a wider inturned flange which abuts against said narrow flange, a locking ring carried by said inner part and projecting within said flanges, a flange upon said locking ring abutting against the outside of said narrow inturned flange to retain said outer part upon said inner part, a ring fastened upon the inward projecting part of said locking ring and abutting against the inside of said wider inturned flange to withdraw said outer part from said inner part, the end of the inner part extending through said locking ring, said locking ring having a slot in which is pivotally mounted a pawl, a projection on this pawl, ratchet teeth formed in the narrow inturned flange at the end of the outer part and a spring also mounted in the slot in the locking ring acting on said pawl to hold the pawl projection normally in engagement with said ratchet teeth whereby inadvertent loosening of the locking ring is prevented, while said outer hub part and locking ring are removed together from said inner hub part without permitting the escape of lubricant therefrom.

In testimony whereof I have signed my name to this specification in the presence of two subscribing witnesses.

JOHN VERNON PUGH.

Witnesses:
ALBERT BROWN,
JOHN RAVEN.